United States Patent
Wu et al.

(10) Patent No.: US 10,805,428 B2
(45) Date of Patent: Oct. 13, 2020

(54) REMOTE POWER MANAGEMENT

(71) Applicant: EMC Corporation, Hopkinton, MA (US)

(72) Inventors: Chao Wu, Shanghai (CN); Li Zhai, Shanghai (CN); Robert Guowu Xia, Shanghai (CN); Sheng Mei, Shanghai (CN); Winson Yin Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 46 days.

(21) Appl. No.: 15/255,526

(22) Filed: Sep. 2, 2016

(65) Prior Publication Data

US 2017/0078450 A1 Mar. 16, 2017

(30) Foreign Application Priority Data

Sep. 10, 2015 (CN) .................. 2015 1 05737998

(51) Int. Cl.
| | |
|---|---|
| *H04L 29/06* | (2006.01) |
| *H04L 29/08* | (2006.01) |
| *H04L 12/26* | (2006.01) |
| *H04L 12/24* | (2006.01) |

(52) U.S. Cl.
CPC .......... *H04L 67/42* (2013.01); *H04L 41/0686* (2013.01); *H04L 43/0817* (2013.01); *H04L 67/10* (2013.01)

(58) Field of Classification Search
CPC . H04L 41/0686; H04L 43/0817; H04L 67/10; H04L 67/42
See application file for complete search history.

(56) References Cited

U.S. PATENT DOCUMENTS

| | | | | |
|---|---|---|---|---|
| 9,740,227 | B2* | 8/2017 | Forbes, Jr. ............. | G05F 1/66 |
| 2002/0062454 | A1* | 5/2002 | Fung .................... | G06F 1/3203 |
| | | | | 713/300 |
| 2004/0168109 | A1* | 8/2004 | Ogura ................. | H04L 41/0681 |
| | | | | 714/47.1 |
| 2007/0089163 | A1* | 4/2007 | Denton ............... | H04L 63/0428 |
| | | | | 726/2 |
| 2008/0215727 | A1* | 9/2008 | Denis .................. | H04L 41/06 |
| | | | | 709/224 |
| 2011/0291478 | A1* | 12/2011 | Cochran .............. | H02J 1/10 |
| | | | | 307/43 |
| 2012/0066519 | A1* | 3/2012 | El-Essawy .......... | H05K 7/1492 |
| | | | | 713/300 |
| 2014/0195704 | A1* | 7/2014 | Bhatia ................ | G06F 13/42 |
| | | | | 710/105 |
| 2015/0309521 | A1* | 10/2015 | Pan .................... | G05F 1/66 |
| | | | | 700/297 |

FOREIGN PATENT DOCUMENTS

WO   WO-2013131239 A1 * 9/2013 ............... H02J 9/04

* cited by examiner

*Primary Examiner* — Joe Chacko
(74) *Attorney, Agent, or Firm* — BainwoodHuang (57) ABSTRACT

Embodiments of the present disclosure provide a remote power management apparatus and management method, wherein the apparatus for managing a power supply by a remote server comprises a managing unit configured to manage the power supply and an interface provided between the remote server and the managing unit, wherein the remote server controls the managing unit via the interface to manage the power supply.

20 Claims, 5 Drawing Sheets

REMOTE POWER MANAGEMENT

RELATED APPLICATION

This application claim priority from Chinese Patent Application Number CN2015105737998, filed on Sep. 10, 2015 at the State Intellectual Property Office, China, titled "REMOTE POWER MANAGEMENT APPARATUS AND MANAGEMENT METHOD," the contents of which is herein incorporated by reference in entirety.

TECHNICAL FIELD

Embodiments of the present disclosure relate to the field of power management.

BACKGROUND

The existing power management protocol PMBus is a digital power supply protocol, which makes power development and system design simpler and more universal. However, PMBus has some drawbacks, for example not being able to meet requirements of some users. For example, a PMBus may be dependent on an onboard system, such that the power system cannot be controlled by alternative ways when an onboard system fails. Besides, it may become inconvenient for a PMBus to expand and change a power supply system. Therefore, a more convenient solution may be desirable to monitor and control power supply state and maintain a power supply in a healthy condition.

SUMMARY

Embodiments of the present disclosure provide a remote power management apparatus and management method that can overcome the above mentioned drawbacks. Embodiments of the present disclosure provide a method and an apparatus for managing a power supply by a remote server, wherein the apparatus is configured to manage a power supply and an interface provided between a remote server and a managing unit, wherein a remote server controls the managing unit via the interface to manage the power supply.

BRIEF DESCRIPTION OF THE ACCOMPANYING DRAWINGS

The accompanying drawings illustrated herein provide further understanding of the present disclosure and constitute part of the present application. Exemplary embodiments of the present disclosure and illustrations thereof are used to explain the present disclosure and do not constitute improper limitation of the present disclosure, wherein.

DETAILED DESCRIPTION

Hereinafter, the principle and spirit of the present disclosure will be described with reference to several exemplary embodiments shown in the accompanying drawings. It should be understood that these embodiments are described only for enabling those skilled in the art to better understand and then further implement the present disclosure, not intended to limit the scope of the present disclosure in any manner.

References in the specification to "one embodiment", "an embodiment", "a preferred embodiment" etc., indicate that the embodiment described may include a particular feature, structure, or characteristic, but every embodiment may not necessarily include the particular feature, structure, or characteristic. Moreover, such phrases are not necessarily referring to the same embodiment. It should also be understood that various terminology used herein is for the purpose of describing particular embodiments only and is not intended to be liming of the disclosure. As used herein, the singular forms "a", "an" and "the" may include the plural forms, unless the context clearly indicates otherwise. It will be further understood that the terms "comprises", "has" and "including" used herein, specify the presence of stated features, elements, and/or components etc., but do not preclude the presence of one or more other features, elements, components and/or combinations thereof. For example, the term "multiple" used here indicates "two or more"; the term "and/or" used here may comprise any or all combinations of one or more of the items listed in parallel. Definitions of other terms will be specifically provided in the following description. Furthermore, in the following description, some functions or structures well-known to those skilled in the art will be omitted in order not to obscure embodiments of the disclosure in the unnecessary details.

One embodiment may include an apparatus for managing a power supply by a remote server. In a further embodiment, an apparatus may include a managing unit that may be configured to manage power supply and an interface may be provided between a remote server and a managing unit, wherein the remote server controls the managing unit via the interface to manage power supply.

In accordance with one embodiment, a managing unit may include a controller that may be configured to control a power supply based on a control signal received from a remote server via an interface. In accordance with one embodiment, a managing unit may include a first monitor that may be configured to monitor at least one of a power supply state, an environmental condition, or an alarm condition based on a monitor signal received from a remote server via an interface, and to transmit monitored information to a remote server via an interface.

In accordance with one embodiment, a managing unit may include a second monitor that may be configured to monitor at least one of a power supply state, an environment condition, or an alarm condition; and an abnormality processor configured to, based on an abnormality in the monitored information, transmit alarm information to a remote server via an interface, and shut down a power supply. In accordance with one embodiment, an interface is adapted to at least one of Ethernet, USB, or USART.

One embodiment of the present disclosure may include a method for managing a power supply by a remote server. In a further embodiment, the method may include providing an interface between a remote server and a managing unit. A further embodiment may include controlling a managing unit by a remote server via an interface to manage a power supply.

In accordance with one embodiment, controlling a managing unit by a remote server via an interface may include controlling a power supply based on a control signal received from a remote server via an interface. In accordance with one embodiment, controlling a managing unit by a remote server via an interface may include monitoring at least one of a power supply state, an environmental condition, or an alarm condition based on a monitor signal received from the remote server via the interface. A further embodiment may include transmitting the monitored information to a remote server via an interface.

In accordance with one embodiment, controlling a managing unit by a remote server via an interface may include monitoring at least one of a power supply state, an environment condition, or an alarm condition. A further embodiment may include transmitting alarm information to a remote server via an interface and shutting down a power supply based on an abnormality in the monitored information. In accordance with one embodiment, the interface is adapted to at least one of Ethernet, USB, or USART.

One embodiment may include a computer program product including a program code, when executed on a processor, which causes the processor to perform the method disclosed above.

Embodiments of the present disclosure provide an apparatus and a method for an effective remote control of a power supply. In a further embodiment, they may satisfy needs of different systems and thus have a wide applicability; moreover, they may provide an effective monitor and control of a system power supply. In an additional embodiment, they may also perform a dynamic control of power, so as to expand a power supply without causing a powered device or system standby.

Figure 1:
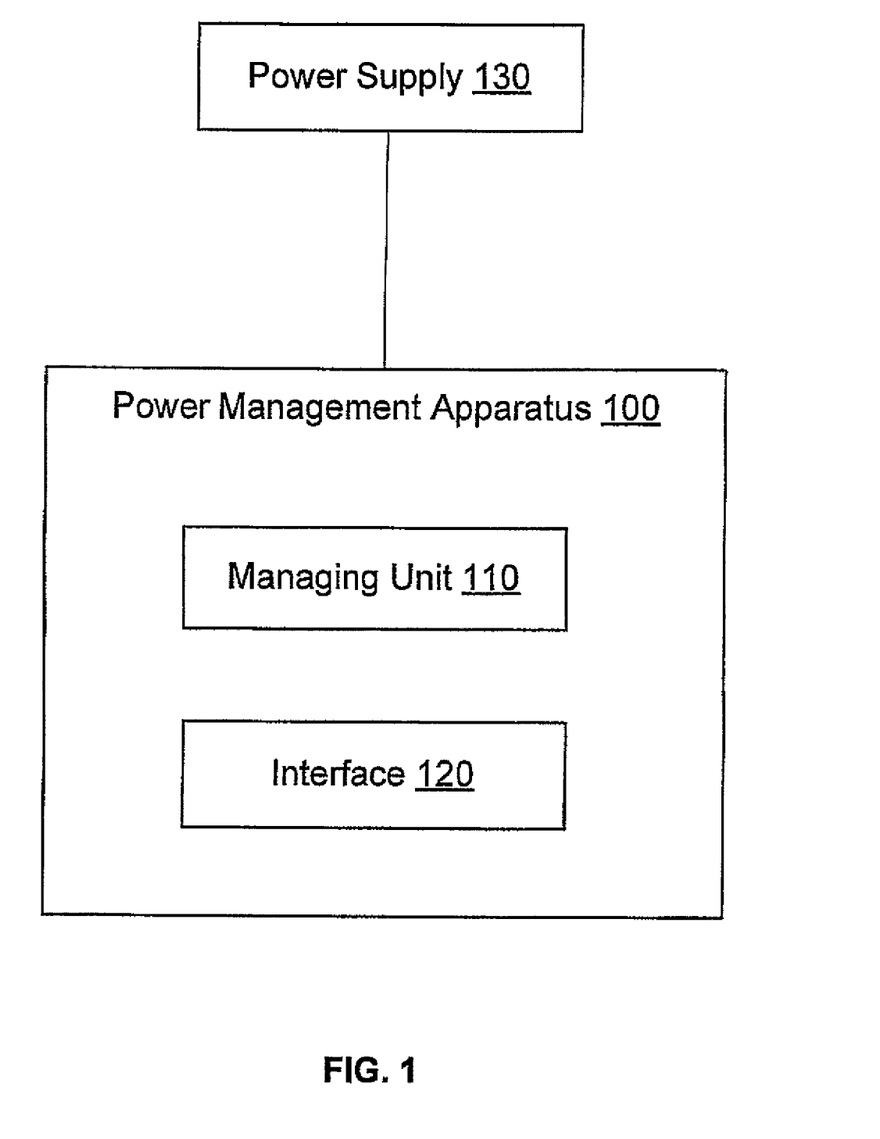
FIG. 1 is an exemplary block diagram illustrating an exemplary power management apparatus according to an embodiment of the present disclosure.

FIG. 1 is an exemplary block diagram illustrating a power management apparatus according to an exemplary embodiment of the present disclosure. As shown in FIG. 1, power management apparatus 100 includes managing unit 110 and interface 120. Managing unit 110 is configured to manage power supply 130. Interface 120 is provided between a remote server and managing unit 110. The remote server may control managing unit 110 via interface 120 to manage a power supply 130.

Interface 120 may adapt at least one of Ethernet, USB, or USART, which may greatly extend application scope of power management apparatus 100.

Figure 2:
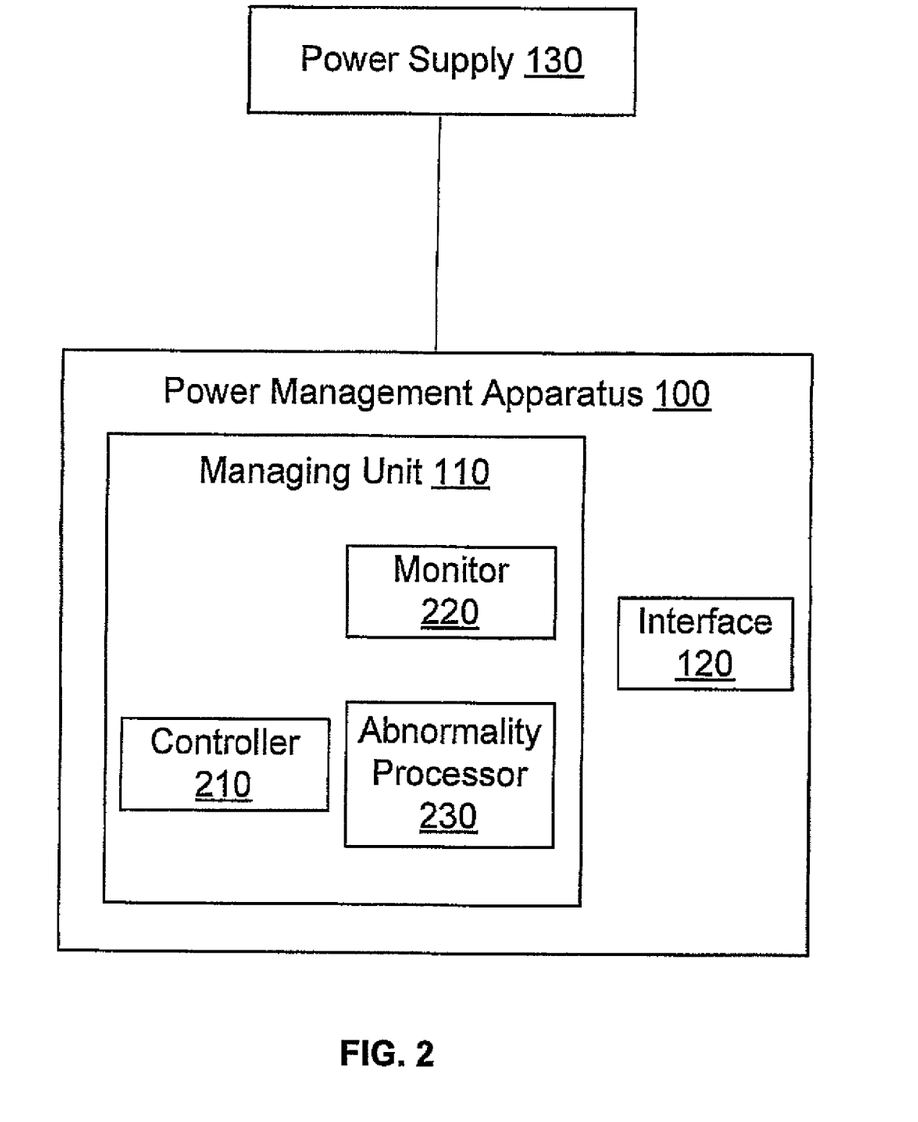
FIG. 2 is an exemplary block diagram illustrating an exemplary power management apparatus according to an embodiment of the present disclosure.

Managing unit 110 may be designed in accordance with actual needs. In order to illustrate the principle of the present disclosure more clearly, FIG. 2 shows a further differentiated block diagram of power managing apparatus 100 according to an exemplary embodiment of the present disclosure. As shown in FIG. 2, managing unit 110 includes controller 210, monitor 220, and abnormality processor 230. However, it should be noted that managing unit 110 may also only include one or two of them to achieve a desired function. FIG. 2 is only for convenience of drawing, and not intended to limit the scope of the present disclosure. Controller 210 for example may be used to control output power, output voltage, output current, output margin, fan rotating speed, power supply operation mode (e.g., active mode or passive mode) of the power supply 130 and the like. Monitor 220 may be used to monitor a power supply state, environment condition and the like, wherein a power supply state may include current input, current output, voltage input, voltage output, margin statistical value, and the like. Monitor 220 may help detect whether an operation state of a power supply is normal by monitoring a power supply state. An environment state may include work environment of a power supply 130, e.g., temperature, humidity, air flow, etc. Besides, monitor 220 may also set an alarm threshold for a power supply 130, e.g., input power threshold, output power threshold, voltage margin, current margin, and fan speed margin, etc. Based on such threshold information, monitor 220 may trigger alarm information when a power supply state or an environment state exceeds a threshold. Abnormality processor 230 may report an abnormal state obtained by monitor 220 to a server via interface 120 and switches off a power supply.

Power management apparatus 100 provided by the embodiments of the present disclosure may comprise three operation modes, i.e., active control mode, active monitor mode, and passive mode, wherein an active control mode and an active monitor mode may be generally referred to an active mode. For managing unit 110, an active control mode may only rely on controller 210, an active monitor mode may only rely on monitor 220, while a passive mode may only rely on monitor 220 (or even only an alarm module of monitor 220) and abnormality processor 230. Hereinafter, these modes will be described in detail with reference to FIGS. 3 and 4, respectively.

Figure 3:
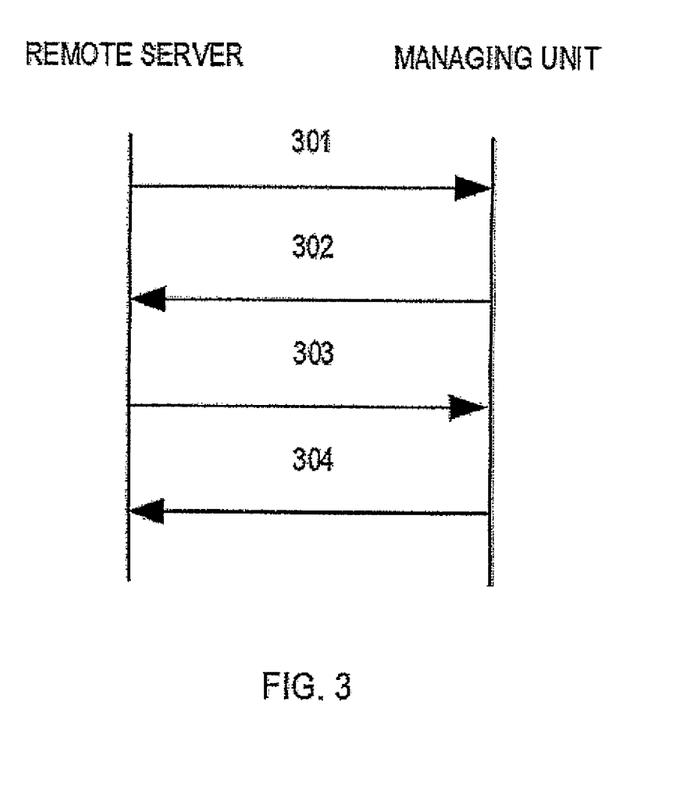
FIG. 3 is an exemplary block diagram illustrating an exemplary method for controlling or monitoring a power supply according to an embodiment of the present disclosure.

FIG. 3 is an exemplary block diagram illustrating a method for controlling or monitoring a power supply according to an examplary embodiment of the present disclosure. As shown in FIG. 3, in an active mode, at step 301, the server first sends a Recommend Connection command to the managing unit for establishing a connection between the server and the power supply. After receiving the Recommend Connection command, at step 302, the managing unit sends an Acknowledge command to the remote server so as to confirm establishment of the connection therebetween. After the remote server acknowledges establishment of the connection, at step 303, the remote server sends a control command or a monitor command to the managing unit. In the case of the active control mode, after receiving the control command, the managing unit manages the power supply and reports to the server at step 304.

In one embodiment, in an active control mode, a server may send a command to controller 210; in an active monitor mode, a server may send a command to monitor 220 and if controller 210 exists, it may also send a command to controller 210. In a further embodiment, in the case of an active monitor mode, after receiving a monitor command, a managing unit monitors a power supply state and an environment state by monitor 220 as required, and sends the obtained information to a server.

It should be noted that the interaction diagram as shown in FIG. 3 is only exemplary, not intended to limit the scope of the present disclosure. For example, steps 301 and 302 may be omitted. In one embodiment, a connection may be established while sending a control or monitor command. In a further embodiment, in case of an active control mode, acknowledgement phase 304 may also be omitted.

Figure 4:
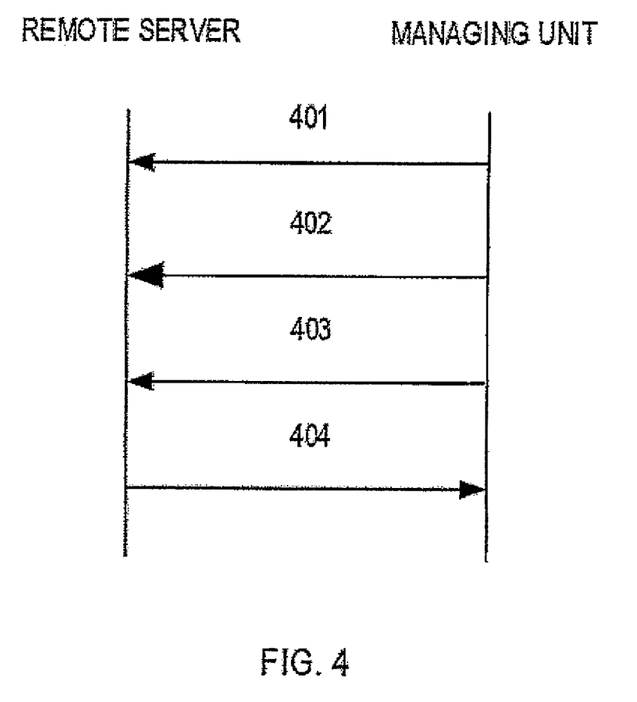
FIG. 4 is a schematic diagram illustrating an abnormality processing method according to an exemplary embodiment of the present disclosure.

FIG. 4 is a schematic diagram illustrating an abnormality processing method according to an embodiment of the present disclosure. As shown in FIG. 4, in a passive monitor mode, managing unit 110 (e.g., abnormality processor 230) sends an alarm message to a server based on an abnormality in information monitored by monitor 220. In FIG. 4, managing unit 110 transmits an alarm message thrice (steps 401-403) to a server until obtaining an acknowledgement from a server (step 404). In one embodiment, three times may be only exemplary, and those skilled in the art may make a specific design according to the actual conditions. In a further embodiment, after obtaining an acknowledgement, managing unit 110 may operate a power supply based on an instruction from a server, or directly shut down a power supply so as to avoid damages. In a further embodiment, managing unit 110 may also use a timeout design, i.e., after a server sends an alarm message, if no acknowledgement is received within a predetermined time (e.g., 3 minutes), the power supply may be automatically shut down.

Figure 5:
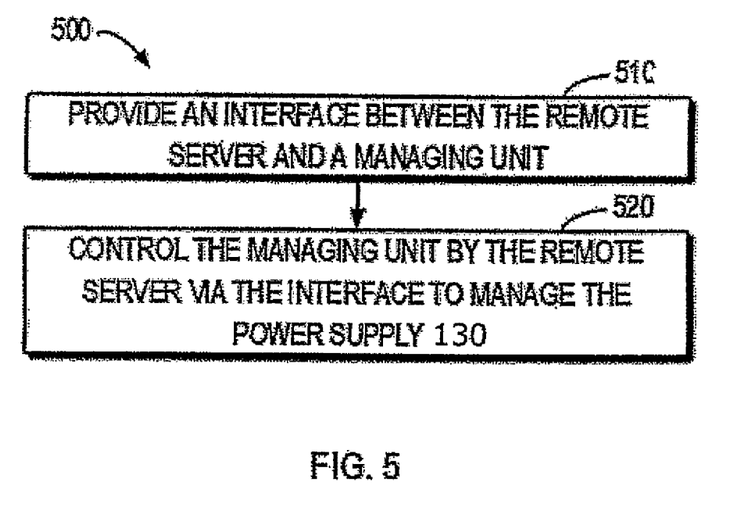
FIG. 5 is a flow diagram illustrating a power management method according to an exemplary embodiment of the present disclosure.

FIG. 5 is a flow diagram illustrating a power management method 500 according to an exemplary embodiment of the present invention. At step 510, an interface is provided between a remote server and a managing unit. At step 520, the managing unit is controlled by the remote server via the interface to manage the power.\

According to an embodiment, step 520 may include controlling a power supply based on a control signal received from a remote server via an interface. According to a further embodiment, step 520 may include monitoring at least one of a power supply state, an environmental condition, or an alarm condition based on a monitor signal received from a remote server via an interface, and transmitting monitored information to a remote server via an interface. According to a further embodiment, step 520 may include monitoring at least one of a power supply state, an environment condition, or an alarm condition; and transmitting alarm information to a remote server via an interface and shutting down a power supply based on an abnormality in the monitored information. According to a further embodiment, an interface may be adapted to at least one of Ethernet, USB, or USART.

It should be noted that the embodiments of the present disclosure may be implemented through hardware, software or a combination of software and hardware. The hardware part may be implemented by a specific logic; the software part may be stored in a memory and executed by a proper instruction execution system, e.g., a micro-processor or specifically designed hardware. Those skilled in the art may understand that the above apparatus and method may be implemented by a computer executable instruction or by being included in processor control code, e.g., such code is provided on a programmable memory or a data carrier such as an optical or electronic signal carrier.

Although the operations of the method according to the embodiments of the present disclosure are described in a specific order in the drawings, it does not require or imply that these operations have to be performed in that specific order, or a desired result can only be achieved by performing all of the illustrated operations. On the contrary, the steps illustrated in the flow diagrams may change their execution order. Additionally or alternatively, some steps may be omitted, a plurality of steps may be combined into one step for execution, and/or one step may be decomposed into a plurality of steps for execution. It should also be noted that the features and functions of two or more modules according to the embodiments of the present disclosure may be embodied in one module. In turn, features and functions of one module described above may also be further divided into a plurality of modules for embodiment.

Although the present disclosure has been described with reference to several preferred embodiments, it should be understood that the present disclosure is not limited to the preferred embodiments disclosed here. Embodiments of the present disclosure intend to cover various modifications and equivalent arrangements within the spirit and scope of the appended claims.

What is claimed is:

1. An apparatus, including one or more processors and memory, for managing a power supply by a remote server, comprising:
 a managing unit, using the one or more processors and memory, configured to manage the power supply; and
 an interface provided between the remote server and the managing unit, the remote server configured to control the managing unit via the interface to manage the power supply;
 wherein the managing unit is enabled to determine whether an abnormality occurred within the power supply, and
 wherein the abnormality within the power supply pertains to at least one of input power, output power, voltage margin, current margin, and fan speed;
 wherein said one or more processors and memory realize a controller constructed and arranged to:
  receive a connection request from the remote server;
  send an acknowledgement to the remote server confirming successful establishment of a connection between the apparatus and the remote server; and
  in response to receipt of a monitor command from the remote server over the established connection, monitor a power supply state and an environmental state;
  send information obtained by monitoring the power supply state and environmental state to the remote server;
  detect the abnormality in the information obtained by monitoring the power supply state and environmental state;
  in response to detection of the abnormality, transmit an alarm message to the remote server;
  receive an acknowledgement of the alarm message from the remote server; and
  in response to receiving the acknowledgement, shut down the power supply in accordance with instructions from the remote server to avoid damage.

2. The apparatus of claim 1, wherein the managing unit is further configured to control the power supply based on a control signal received from the remote server via the interface by a controller.

3. The apparatus of claim 1, wherein the managing unit is configured to:
 based on a monitor signal received from the remote server via the interface monitor information of at least one of: the power supply state, the environmental condition, or the alarm condition; and
 transmit the monitored information to the remote server via the interface.

4. The apparatus of claim 1, wherein the managing unit is further configured to monitor information of at least one of the power supply state, the environmental condition, or the alarm condition; and
 based on an abnormality in the monitored information, transmit alarm information to the remote server via the interface, and shut down the power supply.

5. The apparatus of claim 1, wherein the interface is adapted to at least one of Ethernet, USB, or USART.

6. The apparatus of claim 1, wherein the controller is further constructed and arranged to:
 detect the abnormality in response to a monitored condition of the power supply exceeding a predetermined threshold.

7. The apparatus of claim 6, wherein the controller is further constructed and arranged to:
   retransmit the alarm message after initially transmitting the alarm message to the remote server and receiving no acknowledgement in response to the alarm message.

8. The apparatus of claim 1, wherein the controller is further constructed and arranged to:
   in response to receiving no acknowledgement of the alarm message from the remote server within a predetermined amount of time, shut down the power supply to avoid damage.

9. The apparatus of claim 1, wherein the managing unit is configured to perform at least one of: controlling at least fan speed and monitoring for the fan speed.

10. The apparatus of claim 1, wherein the interface is disposed within the apparatus to support communication over at least one of Ethernet, USB, or USART.

11. A method for managing a power supply of a system, including one or more processors and memory, by a remote server, the method comprising:
   providing an interface between the remote server and a managing unit;
   controlling the managing unit by the remote server via the interface to manage the power supply;
   receiving a connection request from the remote server; and
   sending an acknowledgement to the remote server confirming successful establishment of a connection between the managing unit and the remote server;
   wherein the managing unit is enabled to determine whether an abnormality occurred within the power supply, and
   wherein the abnormality within the power supply pertains to at least one of input power, output power, voltage margin, current margin, and fan speed; and
   in response to receipt of a monitor command from the remote server over the established connection, monitoring a power supply state and an environmental state;
   sending information obtained by monitoring the power supply state and environmental state to the remote server;
   detecting the abnormality in the information obtained by monitoring the power supply state and environmental state;
   in response to detection of the abnormality, transmitting an alarm message to the remote server;
   receiving an acknowledgement of the alarm message from the remote server; and
   in response to receiving the acknowledgement, shutting down the power supply in accordance with instructions from the remote server to avoid damage.

12. The method of claim 11, wherein controlling the managing unit by the remote server via the interface comprises:
   controlling the power supply based on a control signal received from the remote server via the interface.

13. The method of claim 11, wherein controlling the managing unit by the remote server via the interface comprises:
   based on a monitor signal received from the remote server via the interface monitoring information of at least one of the following: the power supply state, the environmental condition, or the alarm condition; and
   transmitting the monitored information to the remote server via the interface.

14. The method of claim 11, wherein controlling the managing unit by the remote server via the interface comprises:
   monitoring information of at least one of the power supply state, the environmental condition, or the alarm condition; and
   transmitting alarm information to the remote server via the interface and shutting down the power supply based on an abnormality in the monitored information.

15. The method of claim 14, wherein the interface is adapted to at least one of Ethernet, USB, or USART.

16. A computer program product for managing a power supply of a system, including one or more processors and memory, using a remote server, the computer program product comprising:
   a non-transitory computer readable medium encoded with computer executable program code, wherein the code enables execution across one or more processors of:
   providing an interface between the remote server and a managing unit;
   controlling the managing unit by the remote server via the interface to manage the power supply;
   receiving a connection request from the remote server; and
   sending an acknowledgement to the remote server confirming successful establishment of a connection between the managing unit and the remote server;
   wherein the managing unit is enabled to determine whether an abnormality occurred within the power supply, and
   wherein the abnormality within the power supply pertains to at least one of input power, output power, voltage margin, current margin, and fan speed; and
   in response to receipt of a monitor command from the remote server over the established connection, monitoring a power supply state and an environmental state;
   sending information obtained by monitoring the power supply state and environmental state to the remote server;
   detecting the abnormality in the information obtained by monitoring the power supply state and environmental state;
   in response to detection of the abnormality, transmitting an alarm message to the remote server;
   receiving an acknowledgement of the alarm message from the remote server; and
   in response to receiving the acknowledgement, shutting down the power supply in accordance with instructions from the remote server to avoid damage.

17. The computer program product of claim 16, wherein controlling the managing unit by the remote server via the interface comprises:
   controlling the power supply based on a control signal received from the remote server via the interface.

18. The computer program product of claim 16, wherein controlling the managing unit by the remote server via the interface comprises:
   based on a monitor signal received from the remote server via the interface monitoring information of at least one of the following: the power supply state, the environmental condition, or the alarm condition; and
   transmitting the monitored information to the remote server via the interface.

19. The computer program product of claim 16, wherein controlling the managing unit by the remote server via the interface comprises:

monitoring information of at least one of the power supply state, the environmental condition, or the alarm condition; and transmitting alarm information to the remote server via the interface and shutting down the power supply based on an abnormality in the monitored information.

20. The computer program product of claim 14, wherein the interface is adapted to at least one of Ethernet, USB, or USART.

* * * * *